United States Patent [19]

Newmark et al.

[11] Patent Number: 4,688,146
[45] Date of Patent: Aug. 18, 1987

[54] MOLDED PLASTIC ENCLOSURE FOR ELECTRIC SERVICE APPARATUS

[75] Inventors: Larry J. Newmark, Avon; David A. Hibbert, Tolland, both of Conn.

[73] Assignee: General Electric Company, New York, N.Y.

[21] Appl. No.: 874,755

[22] Filed: Jun. 16, 1986

[51] Int. Cl.$^4$ .......................... H02B 1/04; H02B 9/00
[52] U.S. Cl. ................... 361/364; 361/357; 16/267; 16/381
[58] Field of Search ............ 312/138 R, 311; 16/381, 16/267, 262; 200/293, 297, 303; 220/341, 342, 266; 361/331, 356, 364–375, 392, 341, 357, 427

[56] References Cited

U.S. PATENT DOCUMENTS

| | | | |
|---|---|---|---|
| 1,884,000 | 10/1932 | Lewis | 361/364 |
| 2,008,104 | 7/1935 | Juvinall | 361/364 |
| 2,683,892 | 7/1954 | Gorman | 16/262 |
| 3,013,297 | 12/1961 | Ferry | 16/381 |
| 3,152,715 | 10/1964 | Daniels | 220/266 |
| 3,438,534 | 4/1969 | Zerwes | 220/266 |
| 3,753,047 | 8/1973 | Shallbetter | 361/364 |
| 4,106,660 | 8/1978 | Boyle | 220/266 |

OTHER PUBLICATIONS

U.S. patent application Ser. No. 811,716, filed Dec. 20, 1985, David A. Hibbert et al., entitled "Molded Plastic Enclosure For Disconnect Switches".

*Primary Examiner*—G. P. Tolin
*Attorney, Agent, or Firm*—Richard A. Menelly; Walter C. Bernkopf; Fred Jacob

[57] ABSTRACT

A three piece molded plastic enclosure for electric service entry apparatus such as meters, fuses, circuit breakers and switches. The enclosure provides protection against adverse environmental conditions while providing visual access to the components contained therein. The enclosure is tamperproof by virtue of a hinge arrangement formed between a stationary cover and a movable door. Once the door is assembled to the cover, the door cannot be easily removed without a separate tool.

14 Claims, 7 Drawing Figures

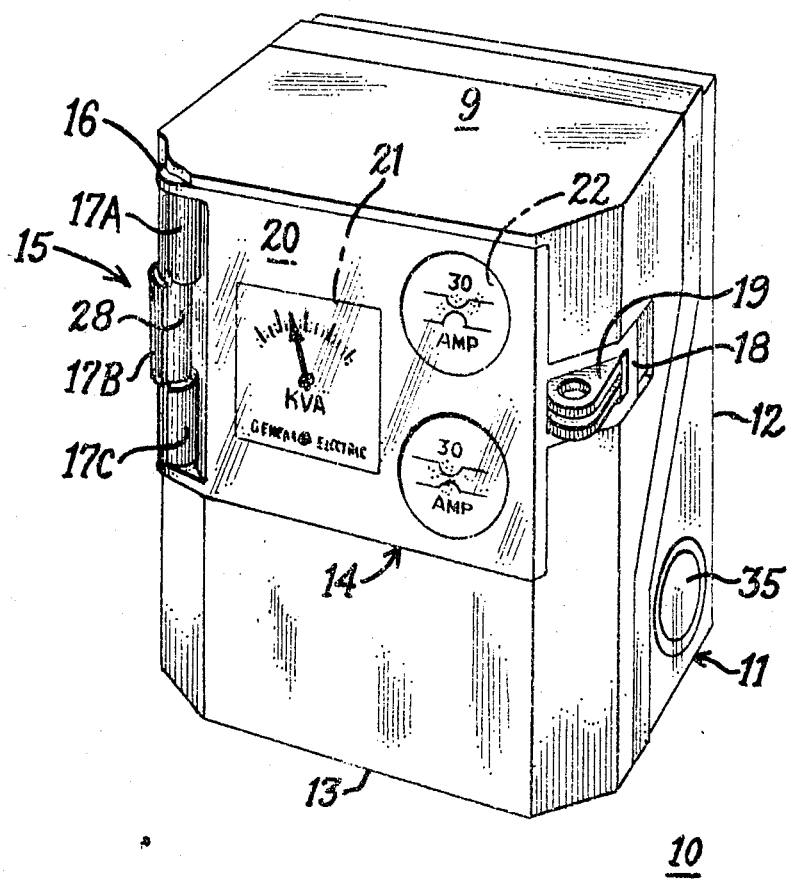

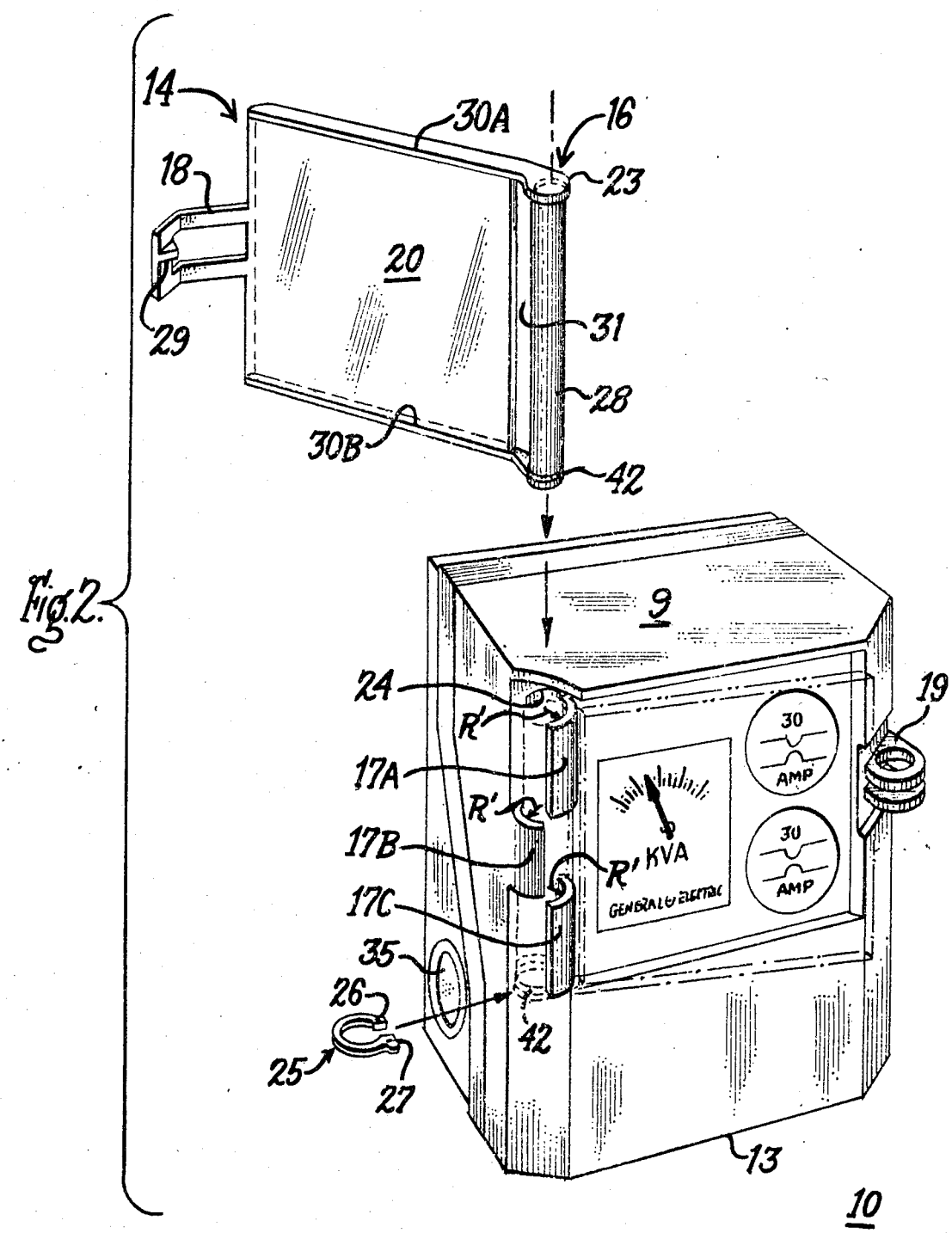

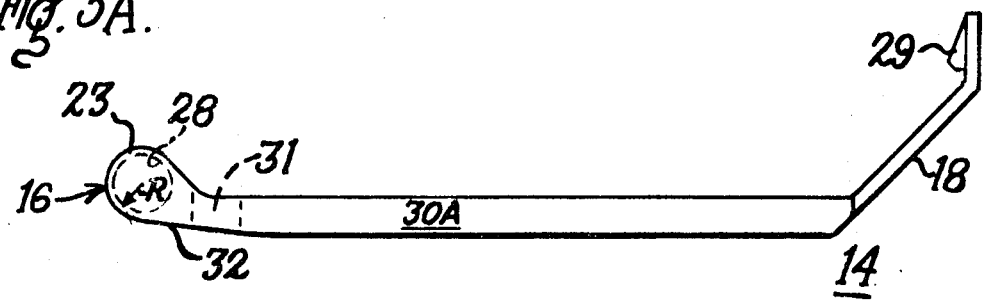
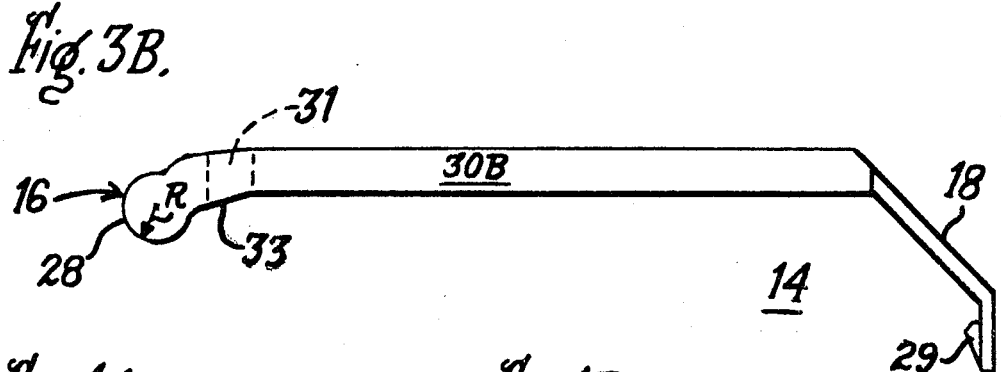
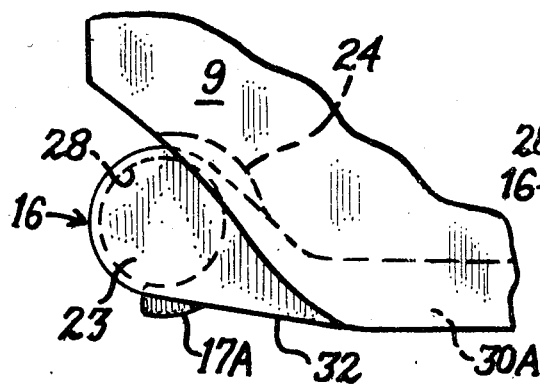
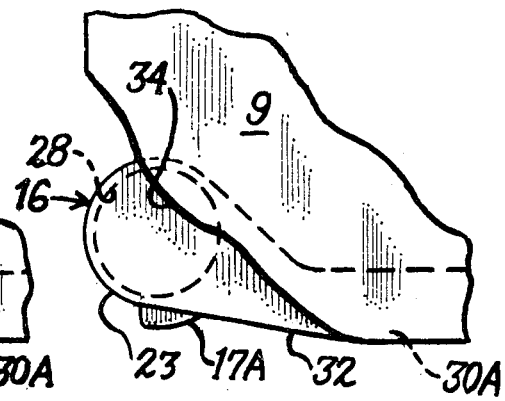

MOLDED PLASTIC ENCLOSURE FOR ELECTRIC SERVICE APPARATUS

BACKGROUND OF THE INVENTION

A three piece molded plastic enclosure is described in U.S. patent application Ser. No. 811,716, filed Dec. 20, 1985, entitled "Molded Plastic Enclosure For Disconnect Switches". The enclosure includes a three piece structure consisting of a base, cover and door individually fabricated by means of an injection molding process. The door is attached to the cover by means of a hinge arrangement wherein part of the hinge is formed as part of the door, while the remaining hinge structure is formed within the cover. The cover portion of the hinge includes a plastic cylinder having a flattened portion for ease in attaching the door to the cover. It has been determined that the door can be removed by forcing the door hinge component away from the cover hinge compartment by means of a special tool.

In some installations, where the enclosure includes service entry equipment for marinas and recreational vehicles and the enclosure is mounted in a public access area, it is required by state and local electric codes that the enclosure be locked and made tamperproof. Should the enclosure contain electrical utility meters for determining power consumption, it is required that the meters be visually accessed without the requirement of unlocking the enclosure. The prior art plastic enclosures mainly consisted of opaque or translucent plastic compositions such that separate meter sockets containing glass enclosed meters were required. Weatherproof metallic enclosures containing service entrance equipment usually provided a glass-enclosed meter projecting through the metal enclosure for visual access.

The aforementioned U.S. patent application is incorporated herein for reference purposes and should be reviewed for its description of the means for attachment between the cover and the case, as well as for the attachment between the case and the support substrate.

SUMMARY OF THE INVENTION

A three piece molded plastic enclosure for electric service entry equipment includes a transparent door attached to a cover by means of a tamperproof hinge arrangement. The door includes an integrally formed hasp for facilitating the insertion of a padlock through locking tabs integrally formed within the cover at one end and an integrally formed hinge pin at an opposite end for attachment within rabbets integrally formed within the cover. The door hinge pin includes a cap at one end which is received within a recess integrally formed within the cover to prevent the hinge pin from being slidably removed after insertion.

BRIEF DESCRIPTION OF THE DRAWINGS

FIG. 1 is a top perspective view of the molded plastic enclosure according to the invention;

FIG. 2 is a top perspective view of the enclosure of FIG. 1 with the door arranged in isometric projection;

FIG. 3A is a top view of the door depicted in FIGS. 1 and 2;

FIG. 3B is a bottom view of the door depicted in FIGS. 1 and 2;

FIG. 4A is a plan view of a section of the enclosure according to the invention detailing the door hinge pin retained within a recess formed within the cover;

FIG. 4B is a plan view of a section of a section of the enclosure according to the invention detailing the hinge pin retained under a projection formed on the cover.

DESCRIPTION OF THE PREFERRED EMBODIMENT

Figure 5:
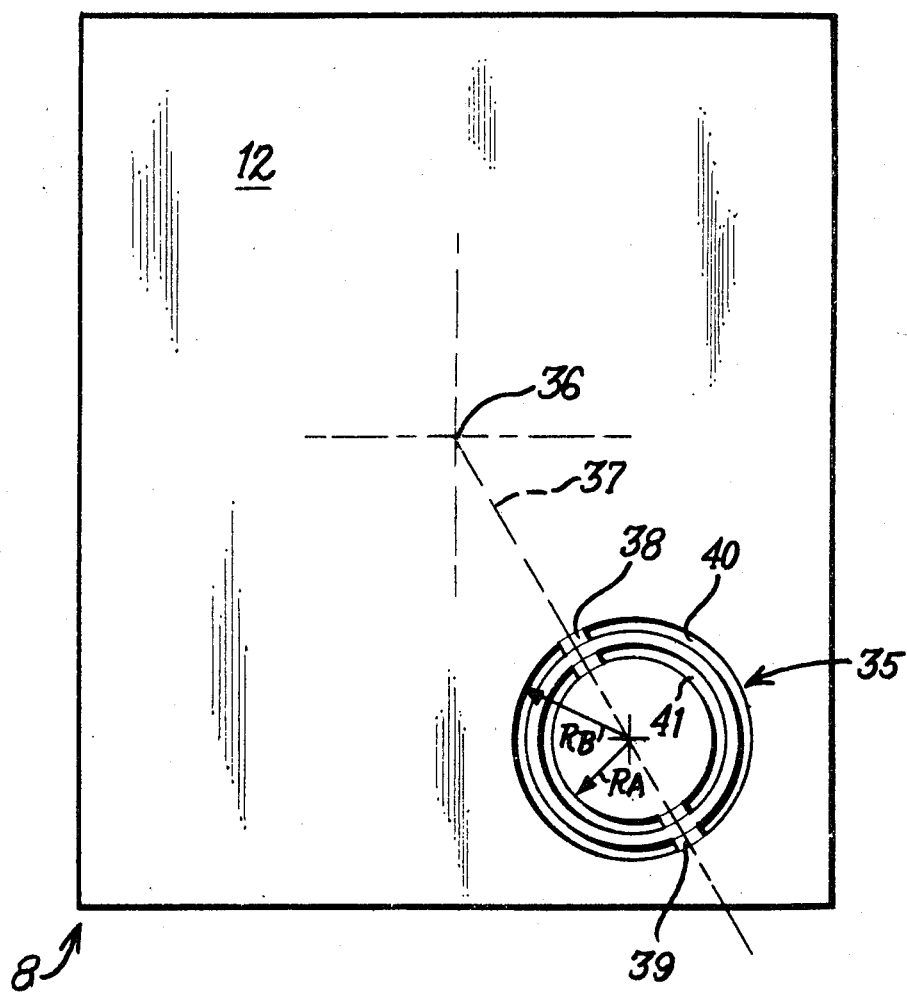
FIG. 5 is a plan view of the back surface of the enclosure depicted in FIG. 1.

A load center 10 consisting of a three piece plastic enclosure 11 is shown in FIG. 1 consisting of a base 12, a cover 13 and a door 14. The base and cover are attached in the manner described within the aforementioned patent application and the door is attached to the cover by means of a novel hinge assembly generally indicated at 15. A cylinder or hinge pin 16 is integrally formed with the plastic material that comprises a transparent face portion 20 and a locking hasp 18. The door is attached to the cover by the insertion of the door hinge pin 16 within integrally formed cover hinge projections or rabbets 17A–17C. Electrical wire access to a meter 21 and replacable fuses 22 within the load center is made through a knockout 35.

The door surrounded by a peripheral rim 30 is securably attached to the cover as illustrated in FIG. 2. The door hinge part 16 is arranged co-axially above the three integrally formed bearing caps or rabbets 17A–17C, which comprise the cover hinge assembly, and the door hinge pin 28 is slidably inserted therein. The clearance gap 31 formed between the hinge pin 28 and the transparent face 20 provides rotational clearance over the cover hinge rabbets 17A–17C. Once the door hinge part 16 is arranged within the cover hinge part 17, a peripheral cap 23, formed at the top of the hinge pin 28, is received within a corresponding detent 24, formed within the cover 13. This prevents the hinge pin from being removed from the cover hinge part 17 when the locking hasp 18 is hooked over the tabs 19, integrally formed within the cover, and a padlock (not shown) is fastened thereto. In accordance with certain code requirements, the door must not be easily removed from the cover without the requirement of a separate tool. To prevent this from occurring, a horseshoe retainer clip 25 could be inserted within a groove 42 formed on the bottom of the hinge pin 28, which is indicated as inserted within the cover hinge part 17, in phantom. The design of the hinge pin without the retainer clip, however, does meet most of these code requirements. To prevent access to the hook-ends 26 and the eyes 27 provided within the hook-ends for the insertion of a special tool, the horseshoe retainer clip is inserted in the indicated direction. Facing the hook-ends 26 proximate the cover prevents access to the hook-ends by the absence of any space between the cover and the hinge pin for the insertion of any horseshoe retainer clip removal tool. The geometry of the door hinge part 16 to ensure the entrapment of the peripheral cap 23 is shown in FIG. 3A, wherein the top 30A of the rim 30 is depicted as including the door hinge part 16 at one end. The locking hasp 18 extends from an opposite side of the door rim. A detent 29 integrally formed with the locking hasp assists in retaining the locking hasp within the cover recess as described in the aforementioned U.S. patent application. The hinge pin 28 comprises a circular configuration having a radius equal to R and the peripheral cap 23 extends outboard of the hinge pin radius as indicated. The clearance gap 31 is shown between the top 30A of the door rim 30 and the door hinge part 16. The bottom 30B of the door rim 30 is depicted in FIG. 3B, wherein the bottom of the hinge pin 28 is shown to consist of the same circular radius R. The hinge pin is attached to the bottom 30B by means of an offset 33, which contains the clearing gap 31 similar to the offset 32 of the top 30A shown in FIG. 3A.

When the door is inserted within the cover, as described earlier with reference to FIG. 2, the door pin 28 passes through the circle defined by radius R' generated by the top arcuate rabbet 17A, which extends radially clockwise from the cover, to complement the circle of equal radius generated by the arcuate rabbet 17B extending radially counterclockwise from the cover and complementary with the circle of the same diameter generated by the arcuate rabbet 17C extending radially clockwise from the cover. Comparing FIGS. 3A, 3B to FIG. 2, the radius R of the hinge pin 28 represents a clearance fit with respect to the radius R' generated within the cover hinge parts 17. This allows the hinge pin to pass down within the cover hinge part 17 until the peripheral cap 23 stops against the top of the uppermost rabbet 17A. The peripheral cap 23 then extends within the detent 24 formed adjacent the top of the uppermost rabbet 17A.

The location of the peripheral cap 23 within the detent 24 of the top 9 of the cover 13 is depicted in FIG. 4A. The extension of the top 30A of the cover rim under the top 9 of the cover 13 and the positioning of the hinge pin 23 within the top arcuate rabbet 17A is also shown.

An alternative embodiment for retaining the hinge pin 23 within the top 9 of the cover 13 is shown in FIG. 4B. Here the peripheral cap 23 is forced past a projection 34 formed on the top of the cover, which snappingly returns to its original position trapping the peripheral cap 23 under the projection 34.

The electrical access knockout 35 is shown in FIG. 5, arranged on the back 8 of the base 12. The access knockout consists of a pair of concentric grooves 40, 41, which allow for openings having a radius $R_A$ or $R_B$, accordingly. A pair of tabs 38, 39 bridge the grooves 40, 41 and are aligned along a radial flow line 37, as indicated. The radial flow line emanates from the plastic "gate" 36 or central location of the molten plastic inlet from where the plastic then diffuses throughout the mold during the manufacture of the base. The radial alignment of tabs 38, 39 is an important feature of the instant invention, since it allows the plastic material to flow past the concentric grooves 40, 41 to provide material to the circle defined by the innermost radius $R_A$. When the base is completely formed, the tabs 38, 39 provide added support to the central radial portion to prevent inadvertent removal, since the concentric grooves 40, 41 are of a predetermined narrow thickness with respect to the remainder of the base. Further, when the material defined by radius $R_A$ is intentionally removed, the tabs provide support to the remaining region defined by radius $R_B$. Also, during the removal of either of the two regions, usually after the enclosure is mounted to a substrate, one tab is broken while the other remains intact to retain the material attached to the base and facilitate removal therefrom, rather than allow the material to fall within the interior of the enclosure.

A molded plastic enclosure for electric service entry apparatus has been disclosed, wherein the cover could be transparent to provide visual access to the condition of the components contained therein and is attached to the enclosure in a virtually tamperproof assembly.

Having thus described our invention, what we claim as new and desire to secure by Letters Patent is:

1. A molded plastic enclosure with electrical apparatus comprising:
   a plastic base attached to a molded plastic cover, said cover including a first arcuate rabbet integrally formed therein receiving a hinge pin integrally located on a molded plastic door and means on said base for receiving an electric switch or circuit breaker;
   said molded plastic door comprising a planar central portion having a locking hasp integrally formed at one end and a hinge pin integrally formed at an opposite end, said hinge pin having first and second radial ends wherein said first radial end has a larger radius than said second radial end, said second radial end and said hinge pin passing through a transverse circular opening defined by said first rabbet and stopping said first radial end from passing through said circular opening; and
   recess means formed within said cover oppositely adjacent said first radial end and receiving said first radial end within said recess means with said hinge pin within said opening to thereby prevent removal of said hinge pin and said door from said cover.

2. The molded plastic enclosure of claim 1 wherein said planar central portion of said door is transparent to provide visual access to electrical apparatus contained therein.

3. The molded plastic enclosure of claim 1 including a second arcuate rabbet integrally formed within said cover, oppositely subjacent said first rabbet; and
   a retainer clip attached to said first radial end subjacent said second rabbet and retaining said hinge pin within said first and second rabbets.

4. The molded plastic enclosure of claim 3 wherein said retainer clip comprises a hook end for insertion and removal, said hook end being oriented toward said cover to prevent access thereto by a retainer clip removal tool.

5. The molded plastic enclosure of claim 1 including an electrical access knockout integrally formed on said base and including a first circular groove formed in said base, said first groove being bridged by a pair of tabs integrally formed within said base and aligned in a predetermined direction on said base.

6. The molded plastic enclosure of claim 5 including a second circular groove formed in said base concentric to said first groove and bridged by said pair of tabs.

7. The molded plastic enclosure of claim 2 wherein said electrical apparatus includes an electric meter.

8. A molded plastic enclosure with electrical apparatus comprising:
   a molded plastic base attached to a molded plastic cover, said cover including a first arcuate rabbet integrally formed therein receiving a hinge pin integrally located on a molded plastic door and means on said base for receiving an electric switch or circuit breaker;
   said molded plastic door comprising a planar central portion having a locking hasp integrally formed at one end and a hinge pin integrally formed at an opposite end, said hinge pin having first and second radial ends wherein said first radial end has a larger radius than said second radial end, said second radial end and said hinge pin passing through a transverse circular opening defined by said first rabbet, said transverse circular opening stopping said first radial end from passing through said circular opening; and displaceable projection means formed within said cover superjacent said first radial end and partially overlapping said first radial end with said hinge pin within said opening to thereby prevent removal of said hinge pin and said door from said cover.

9. The molded plastic enclosure of claim 8 wherein said planar central portion of said door is transparent to provide visual access to electrical apparatus contained therein.

10. The molded plastic enclosure of claim 8 including a second arcuate rabbet integrally formed within said cover, oppositely subjacent said first rabbet; and a retainer clip attached to said first radial end subjacent said second rabbet and retaining said hinge pin within said first and second rabbets.

11. The molded plastic enclosure of claim 10 wherein said retainer clip comprises a hook end for insertion and removal, said hook end being oriented toward said cover to prevent access thereto by a retainer clip removal tool.

12. The molded plastic enclosure of claim 8 including an electrical access knockout integrally formed on said base and including a first circular groove formed in said base, said first groove being bridged by a pair of tabs integrally formed within said base and aligned in a predetermined direction on said base.

13. The molded plastic enclosure of claim 12 including a second circular groove formed in said base concentric to said first groove and bridged by said pair of tabs.

14. The molded plastic enclosure of claim 9 wherein said electrical apparatus includes an electric meter.

* * * * *